J. B. ROSENSTEIN.
VULCANIZING DEVICE FOR RUBBER TIRES.
APPLICATION FILED JAN. 29, 1916.
1,181,085.
Patented Apr. 25, 1916.
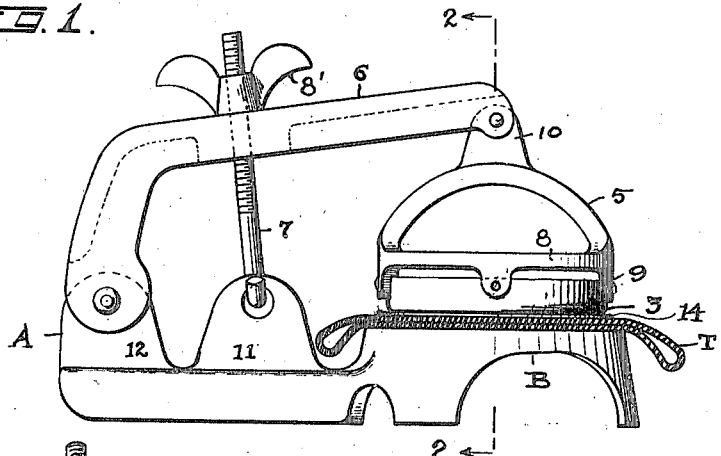
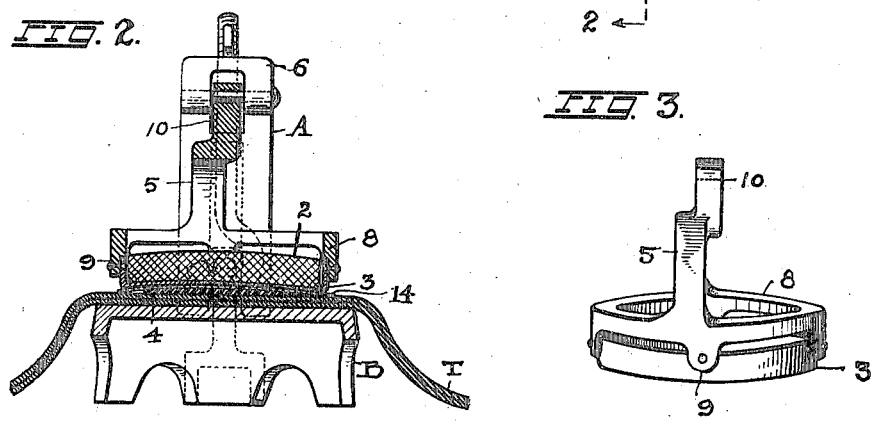
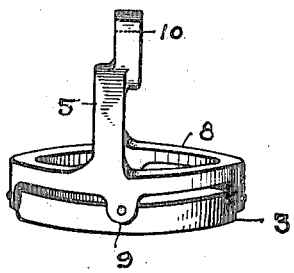
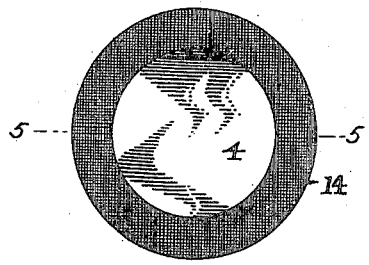
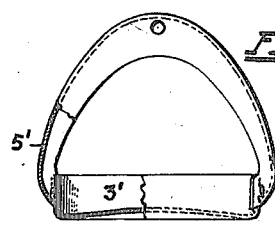
WITNESS
Geo. E. Kricker.
INVENTOR
JACOB B. ROSENSTEIN
BY
Fisher & Moert
ATTORNEYS

UNITED STATES PATENT OFFICE.

JACOB B. ROSENSTEIN, OF CLEVELAND, OHIO, ASSIGNOR TO THE MARVEL ACCESSORIES MANUFACTURING COMPANY, OF CLEVELAND, OHIO, A CORPORATION.

VULCANIZING DEVICE FOR RUBBER TIRES.

1,181,085.

Specification of Letters Patent. Patented Apr. 25, 1916.

Application filed January 29, 1916. Serial No. 74,967.

*To all whom it may concern:*

Be it known that I, JACOB B. ROSENSTEIN, citizen of the United States, residing at Cleveland, in the county of Cuyahoga and State of Ohio, have invented certain new and useful Improvements in Vulcanizing Devices for Rubber Tires, of which the following is a specification.

This invention pertains to a vulcanizing device for rubber tires, all substantially as shown and described and particularly pointed out in the claims. The idea herein is to provide a simple and comparatively cheap portable vulcanizing device to mend punctures in rubber tires generally, such as the inner tubes of automobile tires, and bicycle, motor cycle, and like tires, and the device is an improvement related more particularly to that type or style of vulcanizing device having a vulcanizing member adapted to be clamped upon the patch and the part to be repaired and in which a separate heating unit or device is seated or applied to impart the proper degree of heat to said member so as to effect vulcanization.

In the accompanying drawings, Figure 1 is a side elevation of my improved vulcanizing device and a cross section of a tire and patch clamped therein as in vulcanizing operations. Fig. 2 is a cross section on line 2—2, Fig. 1. Fig. 3 is a perspective detail of the vulcanizing member and yoke. Fig. 4 is a bottom view of the vulcanizing disk or patch and Fig. 5 is a cross section thereof. Fig. 6 is a side elevation of a vulcanizing member and yoke made entirely of sheet metal.

The present vulcanizer is designed more particularly to employ combustible material in a solid form, as the heating medium, preferably a solid combustible disk or unit 2 which can be handled and marketed as a separate article independently of the vulcanizer A and the rubber patch 4. To foster these ends, I have conceived the idea of constructing the device with a cast metal yoke 5 and a shallow and relatively thin sheet-metal receptacle or vulcanizer member 3 permanently secured thereto by rivets or otherwise. These parts, together with a base B and clamping means, such as a pivoted arm 6 and a screw 7 having a wing nut 8', constitute the vulcanizing device, and the yoke 5 and vulcanizing member 3 are unitary and inseparable parts of the organization and capable of performing their functions repeatedly. That is, the heating medium and the rubber patch are the only parts to be supplied to use the apparatus, the patch 4 being placed upon the part to be repaired and the heating unit 2 being placed in the open chamber of member 3. This member is designed to have at least depth enough to receive and hold the combustible disk or unit 2 which is made of any suitable material adapted to burn and heat down through the thin sheet metal bottom of said member. Relatively thin sheet metal is used to impart the proper amount of heat for the required period of time so as to effect vulcanization. On the other hand the sheet metal member 3 requires rigidity and strength to withstand the pressure and strain of the necessary clamping to effect vulcanization, and this is supplied by the cast metal yoke 5. Of course, I might stamp or fashion a vulcanizing body 3' and bail 5' out of sheet steel substantially as shown in Fig. 6, but at present I prefer to use a cast metal yoke 5 in spanning relation to a ring or band 8 having ears 9 riveted, welded or otherwise affixed to the sheet metal member 3. The yoke or bail 5 is also set off the center between its perforated top portion 10 and the center or middle of said ring, thus providing room at one side to introduce the heating unit 2 within the chamber of member 3. Sheet metal member 3 is also spaced apart from the main body or ring 8 of yoke 5 by affixing said member to downwardly-extending lugs or ears 9, the object being to prevent material loss of heat in member 3 by conduction to yoke 5.

The base or table B is raised and circular and has a flat top surface which comes centrally beneath the suspended vulcanizing member 3. Otherwise the said base has a rear extension provided at its top with upward projections or lugs 11 and 12 respectively, and the bent end of arm 6 pivots on said lug 12 while the clamping screw 7 is engaged with the lug 11. The vulcanizing member 3 is pivotally swung from the front of said arm, while the clamping screw 7 extends through the said arm near its middle.

In use, the base B provides a support for the part to be repaired, and the patch is placed upon this part. Both parts as thus assembled are then clamped between the base or support B and vulcanizing member 3, the nut 8' being tightened as firmly as may be needed, and the pivot of yoke or bail 5 on the end of arm 6 automatically bringing the vulcanizing member 3 evenly into clamping and vulcanizing relations. Thus in Fig. 1 I show a tire or flat rubber tube T clamped in place, and the rubber vulcanizing patch or piece 4 which I prefer to use is especially prepared with a cover or backing 14 of disk shape consisting preferably of woven fabric of some suitable kind. This cover or backing 14 is of such larger area as compared with said patch 4 that it will extend slightly beyond the bottom edge of vulcanizing member 3 to aid the eye in centering the patch in respect thereto and to the puncture. Such a cover or shield upon the back of the patch protects the part to be mended where the vulcanizing member 3 overlaps the patch, and is found necessary also to prevent the patch from adhering or sticking to the bottom of said vulcanizing member. Where a vulcanizing member is subjected to repeated use, the bottom of the vulcanizing member often becomes rough or accumulates more or less rubber or other substances, thus preventing or defeating satisfactory vulcanization of the patch to the tire. So it occurs that the intervening disk or backing 14 made of open-mesh or woven fabric serves the threefold purpose of a centering guide in placing the rubber patch in place prior to vulcanizing operations, of precaution against possible adhesion of the patch to the vulcanizing bottom, and as a protection against burning the tire about the patch. However, this vulcanizing patch with its backing is not my invention; it is an article of manufacture now on the market, and the combustible disk is also obtainable in the market. Each has its advantages as described, but the vulcanizer A is not necessarily limited in use to these articles as it has a broader application. For example, an electrical heating unit may be seated within the chamber of the vulcanizing member 3 in lieu of the disk, and the rubber patch applied to the tire without a cover 14, all according to old and established practices.

What I claim is:

1. A vulcanizing device comprising a yoke having a sheet metal vulcanizing bottom permanently attached thereto and chambered to seat a heating unit, a base and an arm pivoted thereon in pivoted connection with said yoke, and clamping means for said arm engaged with said base.

2. A vulcanizing member having a shallow chamber and a thin vulcanizing bottom to seat a heating unit and provided with a bail having its sides off center in respect to said chamber, and a support for said member comprising a base and a clamping arm hinged to said base.

3. A vulcanizing device, comprising a base, an arm hinged to said base, a yoke pivotally suspended from said arm opposite said base, a relatively thin sheet-metal vulcanizing member affixed to said yoke, said member having a chamber to seat a heating unit, and a clamping screw and nut connecting said base and arm.

In testimony whereof I affix my signature in presence of two witnesses.

JACOB B. ROSENSTEIN.

Witnesses:
  GEO. E. KRICKER,
  F. C. HARROLD.